No. 880,129. PATENTED FEB. 25, 1908.
J. S. DUNCAN & J. L. CRIST.
VEHICLE.
APPLICATION FILED JULY 17, 1907.

3 SHEETS—SHEET 2.

Witnesses

Inventors
John S. Duncan
Jacob L. Crist
By
Attorneys

No. 880,129. PATENTED FEB. 25, 1908.
J. S. DUNCAN & J. L. CRIST.
VEHICLE.
APPLICATION FILED JULY 17, 1907.
3 SHEETS—SHEET 3.
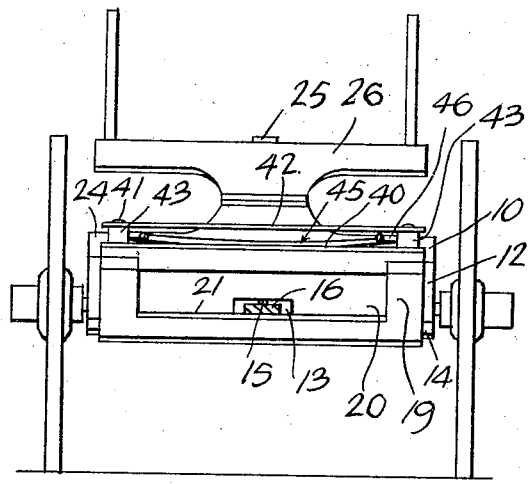
Fig-3-
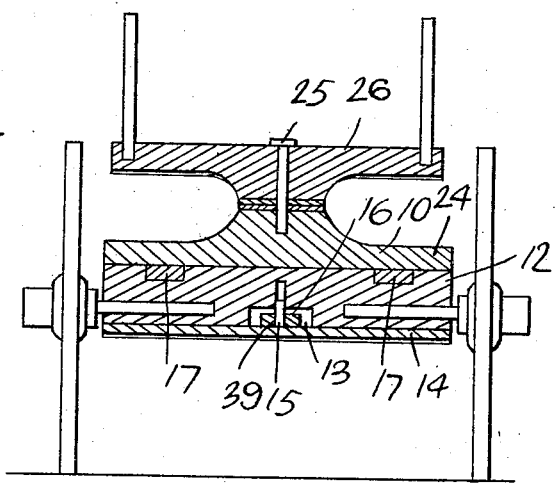
Fig-6-

UNITED STATES PATENT OFFICE.

JOHN S. DUNCAN AND JACOB L. CRIST, OF LYNCHBURG, VIRGINIA.

VEHICLE.

No. 880,129.  Specification of Letters Patent.  Patented Feb. 25, 1908.

Application filed July 17, 1907. Serial No. 384,165.

*To all whom it may concern:*

Be it known that we, JOHN S. DUNCAN and JACOB L. CRIST, citizens of the United States, residing at Lynchburg, in the county of Campbell, State of Virginia, have invented certain new and useful Improvements in Vehicles; and we do hereby declare the following to be a full, clear, and exact description of the invention, such as will enable others skilled in the art to which it appertains to make and use the same.

This invention relates to new and useful improvements in vehicles and it has more particular reference to that class of vehicles in which a short turning gear is employed, whereby in rounding curves the rear wheels follow in the track of the front wheels. In connection with a vehicle of the above type the invention has for its object to provide novel means for swinging the rear truck to correspond to the swinging motion of the front truck.

The invention aims as a further object to provide a novel construction, combination and arrangement of parts, the details of which will appear in the course of the following description in which reference is had to the accompanying drawings, forming a part of this specification, like characters of reference designating similar parts, throughout the several views, wherein:—

Figure 1:
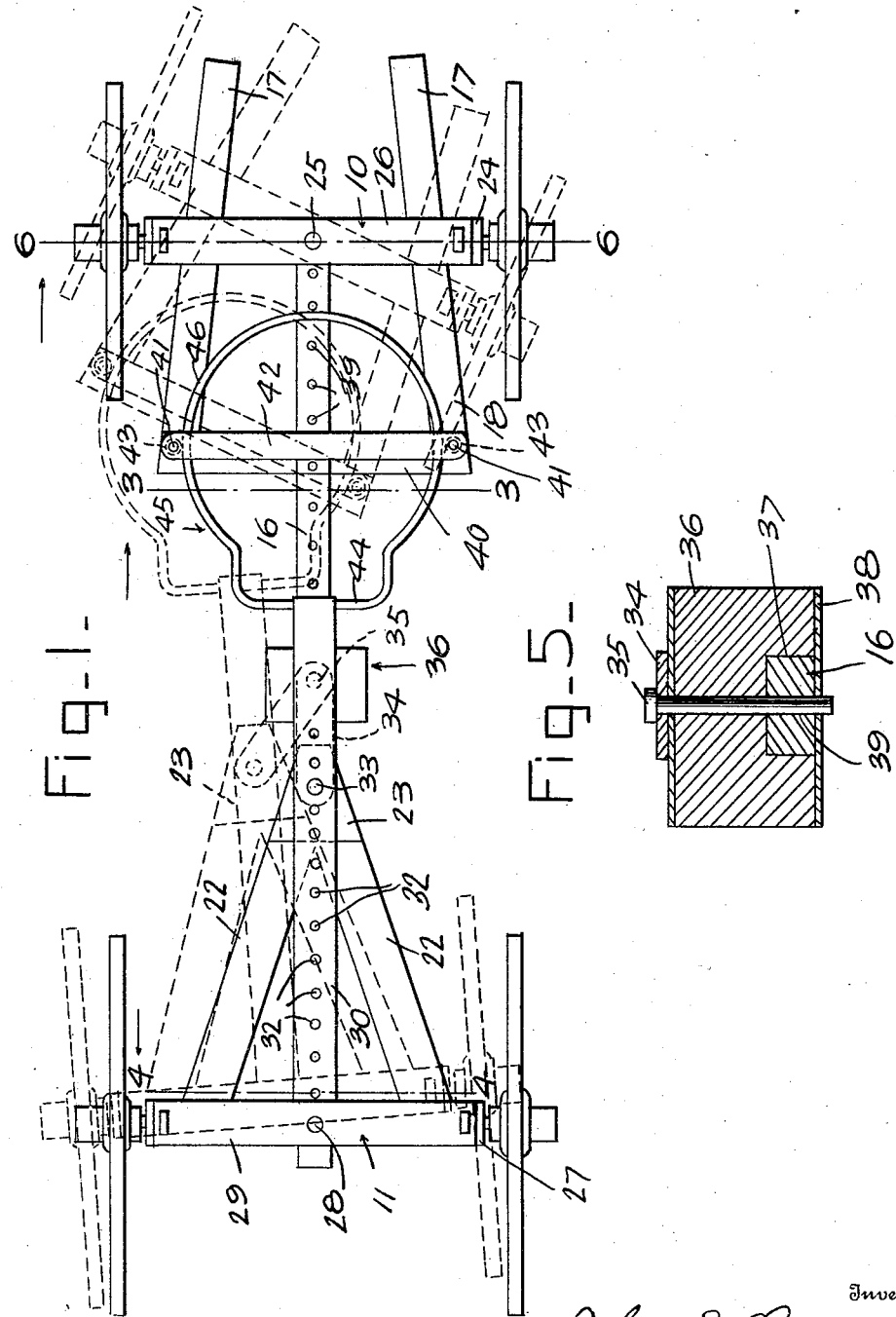
Figure 2:
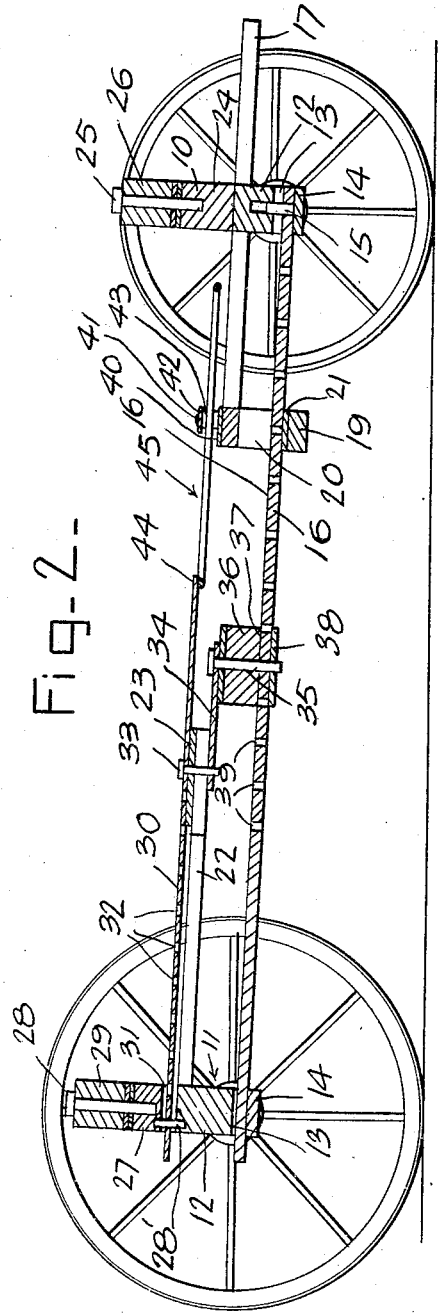
Figure 4:
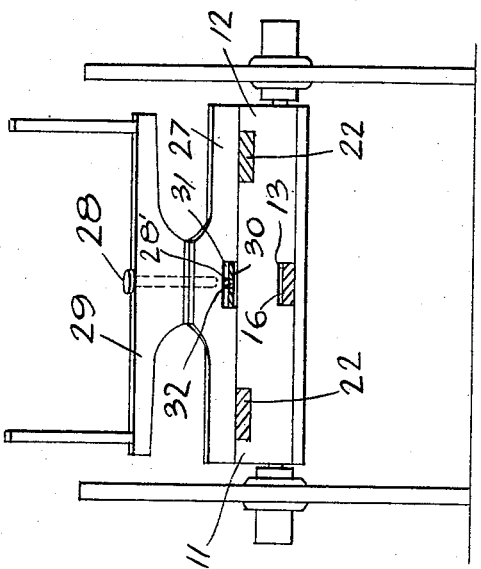

Figure 1 is a top plan view of a vehicle with the body shown in dotted lines and the steering gear in the turning position. Fig. 2 is a section taken longitudinally through the vehicle, the body being removed. Fig. 3 is a section on the line 3—3 of Fig. 1, looking in the direction of the arrow. Fig. 4 is a section on the line 4—4 of Fig. 1 looking in the direction of the arrow. Fig. 5 is a detailed view of an adjustable movable block comprehended in the invention. Fig. 6 is a section on the line 6—6 of Fig. 1 looking in the direction of the arrow.

In the accompanying drawings, the numeral 10 designates the front truck and the numeral 11, the rear truck. The trucks 10 and 11 including the usual axle trees 12 which are formed at their lower ends with recesses 13 closed by base pieces 14 and in the recess 13 of the front axle tree 12 there is engaged, by means of a pivot bolt 15, the end of a longitudinal reach 16. The axle tree 12 of the front truck is recessed in its upper face to receive the arms 17 of a hound 18, the latter including the body portion 19 formed with a horizontal slot 20, carrying upon its lower face a wear plate 21. The truck 12 of the rear bolster likewise has connection with the angularly disposed arms 22 of the rear hound, the said arms being connected at their front ends by a strap or plate 23. Imposed upon the front truck 12, is a truss 24 having pivotal connection by means of a king bolt 25 with the front bolster 26. A similar truss 27 is imposed upon the rear axle tree 12 and the latter has connection by means of a king bolt 28 with the rear bolster 29. A bolt 28' is pivotally engaged through the end of a member 30 which is received in a recess 31, formed in the lower face of the truss 27. The member 30 is formed along its body portion with a line of apertures 32 through a selected one of which, a pin 33 is engaged, the pin 33 being likewise engaged through the arm 34 pivoted by means of a pin 35 upon the upper face of a block 36. The block 36 is formed in its lower face with a recess 37 to receive the reach 16 and the said recess is closed by a detachable plate 38, the pin 35 passing through the arm 34, the block 36, the reach 16 and the plate 38. The reach 16 is formed with a line of openings 39, and the pin 35 is engaged through a selected one of the openings 39.

Imposed upon the body 19, is a plate 40, carrying at its ends upstanding posts 41, the latter being engaged with the ends of a horizontal plate 42, and serving as pintles for vertical friction rollers 43, interposed between the ends of the plates 40 and 42. The member 30, at its front end, has rigid connection with the horizontal arm 44 of an open frame 45, the latter being preferably constructed of a bent rod and including a curved working portion 46, which, at all times, bears against the rollers 43.

In use, when the front axle is turned in either direction, the rollers 43 will bear against corresponding sides of the curved portion 46 and by means of the connecting member 30, will swing the rear axle upon the bolt 28 as a pivot, whereby the rear wheels will assume such an angle with relation to the front wheels that they will follow in the track of the latter in rounding curves.

The openings 32 and 39 are provided in order that the various connections may be adjusted to the frames of wagons of varying lengths.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. The combination with the pivoted front and rear trucks of a vehicle, and the reach connecting said trucks, of a member carried by the rear truck and at its front end having connection with an open frame provided with a curved working portion, spaced plates supported rearwardly of the front truck and fixed with relation thereto and pins interposed between the ends of said plates, said curved working portion projecting between said plates and bearing relatively opposite sides thereof against said pins.

2. The combination with the pivoted front and rear trucks of a vehicle, and a reach connecting said trucks, of a member supported from the rear truck, an open frame carried at the front end of said member and having a curved working portion, a block mounted upon said reach, a plate pivoted to said block and having pivotal connection at its other end with said member, spaced plates supported rearwardly of the front truck, said curved working portion projecting between said plates, and friction rollers mounted between the ends of said plates and formed to bear against said curved working portion.

In testimony whereof, we affix our signatures, in presence of two witnesses.

JOHN S. DUNCAN.
JACOB L. CRIST.

Witnesses:
   JNO. H. CHRISTIAN,
   ALBERT S. HESTER.